United States Patent [19]

Shoji et al.

[11] Patent Number: 4,594,620
[45] Date of Patent: Jun. 10, 1986

[54] DISK STORAGE FILE WITH A FOUR PHASE, SINGLE PHASE DRIVE STEPPING MOTOR

[75] Inventors: Makoto Shoji, Fussa; Yoshiaki Sakai, Higashikurume, both of Japan

[73] Assignee: Teac Corporation, Tokyo, Japan

[21] Appl. No.: 588,677

[22] Filed: Mar. 12, 1984

[30] Foreign Application Priority Data

Apr. 1, 1983 [JP] Japan ................................. 58-56892

[51] Int. Cl.⁴ .............................................. G11B 5/54
[52] U.S. Cl. ..................................... 360/75; 318/685; 318/696
[58] Field of Search .................. 318/685, 696; 360/75, 360/78

[56] References Cited

U.S. PATENT DOCUMENTS

| | | | |
|---|---|---|---|
| 3,678,481 | 7/1972 | Dalziel et al. | 340/174 |
| 4,089,029 | 5/1978 | Castrodale et al. | 360/99 |
| 4,356,439 | 10/1982 | Mott et al. | 318/685 |
| 4,394,696 | 7/1983 | Yoshimaru | 360/78 |
| 4,395,742 | 7/1983 | Ostroff | 360/78 |
| 4,542,429 | 9/1985 | Nishida et al. | 360/103 |

*Primary Examiner*—George G. Stellar
*Attorney, Agent, or Firm*—Woodcock, Washburn, Kurtz, Mackiewicz & Norris

[57] ABSTRACT

A storage file for particular use with a flexible magnetic disk having a series of concentric magnetic tracks thereon, comprising a four phase stepping motor for moving a transducer head radially of the magnetic disk. The stepping motor has several sets of first, second, third and fourth phase windings arranged sequentially in the order named. A radial drive control circuit is provided which normally acts to cause energization of the stepping motor windings in a single phase drive mode to cause rotation of the rotor by discrete increments. In order to prevent the rotor from being trapped in alignment with the third phase windings, instead of being returned to the first phase windings, when the disk file is electrically turned on, the radial drive control circuit further functions to briefly energize a selected one or more of the second, third and fourth phase windings of each set, with the simultaneous or subsequent energization of the first phase windings. This makes it possible to positively return the transducer head to the outermost track zero position on the magnetic disk, for the commencement of proper data transfer therebetween, despite the unavoidable sensing errors of an optical "track zero" sensor commonly built into the device.

7 Claims, 9 Drawing Figures

FIRST PHASE DRIVE CONTROL SIGNAL

SECOND PHASE DRIVE CONTROL SIGNAL

THIRD PHASE DRIVE CONTROL SIGNAL

FOURTH PHASE DRIVE CONTROL SIGNAL

A SUPPLY VOLTAGE

B OUTPUT FROM "POWER ON" SENSING CIRCUIT 32

C OUTPUT FROM TIMER 66

D FIRST PHASE DRIVE CONTROL SIGNAL

E SECOND PHASE DRIVE CONTROL SIGNAL

FIG. 9

DISK STORAGE FILE WITH A FOUR PHASE, SINGLE PHASE DRIVE STEPPING MOTOR

BACKGROUND OF THE INVENTION

Our invention concerns apparatus for data transfer between a transducer head and a dislike storage medium such as, typically, a flexible magnetic disk, now commonly known as a floppy disk. More specifically our invention pertains to such a disk file or drive incorporating a stepping motor of the four phase, single phase drive type to cause the incremental motion of the transducer head in a radial direction of the data storage medium in relation to the rotation of the latter.

Flexible magnetic disks have found widespread acceptance in formation processing and allied industries as compact data storage media. The magnetic disk in general use has a series of concentric magnetic tracks for direct accessing by a magnetic transducer head. Data transfer between disk and head takes place as the disk is rotated and the head moved radially of the disk. Generally employed for such radial movement of the transducer head with respect to the magnetic disk is a stepping motor, otherwise known as a stepper motor, magnetic stepping motor, step servo motor, etc. Dalziel et al. U.S. Pat. No. 3,678,481 and Castrodale et al. U.S. Pat. No. 4,089,029 respresent examples of disk files employing stepping motors.

It is essential in this type of disk files that the transducer head be positioned on the outermost track (track zero) of the disk for proper data transfer when the device is electrically turned on. The device has a provision (optical "track zero" sensor) for sensing the head position on the disk upon closure of the power switch. If it senses the head position on tracks other than track zero, the head is automatically returned to the required initial position, the writing or reading of information being initiated thereafter. In the use of a four phase, single phase drive stepping motor, however, there has been the possibility of the head position being determined as being on track zero while actually the head is not returned to the track zero position. This has lead to improper data transfer. We will discuss in the following paragraphs how this has occurred.

Figure 3:
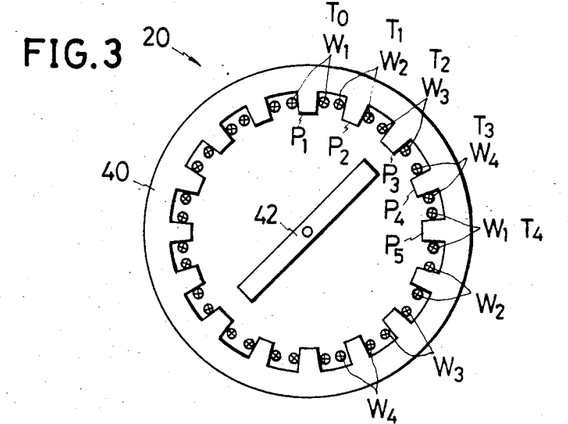
FIG. 3 is a diagrammatic cross section through the four phase, single phase drive stepping motor of the permanent magnet type in the disk file of FIG. 1.

The four phase, single phase drive stepping motor has several (e.g. four) sets of first, second, third and fourth phase windings arranged sequentially on stator poles of annular arrangement around a rotor (see FIG. 3 of the drawings attached hereto). The stator windings correspond to respective tracks on the magnetic disk. Only the first phase windings are energized upon closure of the power switch. If then the rotor has already been aligned with the first phase winding of the first set which corresponds to track zero, it will be retained in that angular position, and a signal representative of the correct initial rotor position will be produced to allow the device to initiate data transfer. If the rotor has initially been aligned with the second phase winding of the first set, it will turn to the first phase winding upon excitation thereof. If the rotor has initially been aligned with the fourth phase winding of the first set, it will turn to the first phase winding of the second set adjoining the fourth phase winding of the first set and will subsequently be returned to the first phase winding of the first set.

The rotor has been held stationary, however, upon excitation of the first phase windings if it has initially been aligned with the third phase winding of the first set, for example. This is because the rotor is positioned at the point of magnetic equilibrium between the first phase windings of the first and second sets.

The rotor will nevertheless be subsequently returned to the first phase winding corresponding to track zero if the "track zero" sensor senses that the transducer head has not been returned thereto upon initial excitation of the first phase windings. However, the optical "track zero" sensor of current construction is prone to determine that the transducer head is on track zero when it actually is not. Generally the magnetic disk storage file employing a four phase, single phase drive stepping motor for head movement is conditioned to start data transfer when the following three requirements are all met:

1. The sensing of the track zero position of the transducer head by the optical "track zero" sensor from the position of a mechanical part in the radial head drive mechanism.
2. The excitation of the first phase windings of the stepping motor.
3. The excitation of the stepping motor windings in a sequence to cause radially outward motion of the transducer head with respect to the magnetic disk.

The disk file control system self satisfies the above second and third requirements upon closure of the power switch. It is the first requirement that determines whether the disk file can be properly conditioned for the start of data transfer or not. The conditioning of the device for the start of data transfer would be easy if the "track zero" sensor could accurately sense the head position on track zero. This is not so; operating optically, the "track zero" sensor output may indicate that the transducer head is on track zero when it is actually anywhere between track zero and track two.

Thus the foregoing three conditions may all be seemingly fulfilled even though the transducer head is actually on track two, with the stepping motor rotor detended in alignment with the third phase winding corresponding to track two. The result has been erroneous data transfer between magnetic disk and transducer head.

SUMMARY OF THE INVENTION

We have found a solution to the above problem heretofore left unsolved in disk storage files of the type having a four phase, single phase drive stepping motor for head transport and make it possible to infallibly return the transducer head of the disk file to the track zero position on the record disk when the device is electrically turned on.

Stated in brief, our invention provides a storage file for use with a disklike record medium, comprising a rotary drive mechanism for imparting rotation to the record medium, and a radial drive mechanism for moving a transducer head radially of the record medium. The radial drive mechanism includes a four phase stepping motor having a plurality of sets of first, second third and fourth phase windings of annular arrangement around a rotor. Provided for controlling the stepping motor is control circuit means which normally energizes the motor windings in a single phase drive mode to cause incremental rotation of the rotor and hence the incremental linear travel of the transducer head radially of the record medium. When the device is electrically turned on, the control circuit means functions to energize at least one of the second, third and fourth phase windings of each set for a preassigned length of time and to energize the first phase windings upon lapse of the preassigned length of time at the latest.

The brief energization of one or more of the second, third or fourth phase windings of each set, followed or accompanied by the energization of the first phase windings, upon closure of the power switch is effective to turn the rotor even if the latter has initially been aligned with the third phase windings. The transducer head may therefore be returned to the track zero position on the record medium for the start of proper data transfer therebetween in the face of some sensing errors of the optical "track zero" sensor that may be built into the device.

The above and other features and advantages of our invention and the manner of realizing them will become more apparent, and the invention itself will best be understood, from a study of the following description and appended claims, with reference had to the attached drawings showing a preferred embodiment of the invention and a modification thereof.

DESCRIPTION OF THE PREFERRED EMBODIMENTS

General

Figure 1:
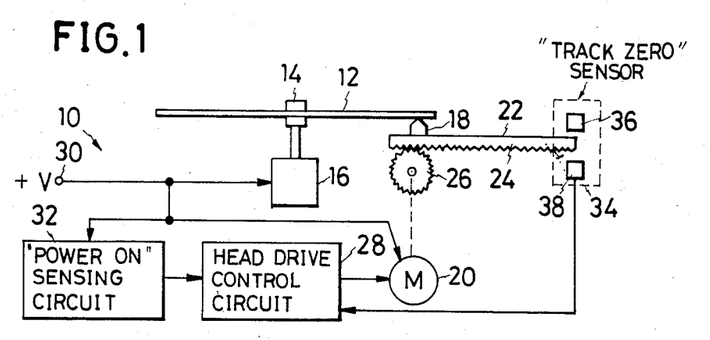
FIG. 1 is a schematic illustration, partly in block diagrammatic form, of a flexible magnetic disk storage file incorporating the novel concepts of our invention, the figure showing only those parts of the device which are essential for an understanding of the invention.

We have diagrammatically illustrated in FIG. 1 the general organization of an example of disk file in accordance with our invention insofar as is necessary for a full understanding of our invention. Generally designated 10, the exemplified disk file is intended for use with a flexible magnetic disk 12, which normally is enclosed in a protective envelope to make up a disk cartridge, as will be later described in more detail. The magnetic disk 12 is herein shown engaged by a clamp mechanism 14. Coupled to the clamp mechanism 14 is a disk drive motor 16 which imparts rotation to the magnetic disk 12.

A single magnetic transducer head 18 is shown arranged for data transfer contact with the underside of the magnetic disk 12. The transducer head 18 is moved radially of the magnetic disk 12 by a head drive motor 20 via a rotary to linear converter mechanism 22. The head drive motor 20 is a stepping motor to be detailed subsequently. The rotary to linear converter mechanism 22 is shown to comprise a rack 24 carrying the transducer head 18 and a pinion 26 engaged with the rack, the pinion being coupled to the head drive motor 20. This head drive motor is under the control of a head drive control circuit 28 which also is to be detailed presently. A common supply terminal 30 is connected to the disk drive motor 16, to the head drive motor 20 and, via a "power on" sensing circuit 32, to the head drive control circuit 28. We assume that the supply terminal 30 is connected, on the other hand, to the supply circuit, not shown, of the complete data processing system of which the illustrated disk file 10 forms a part. The power switch is provided to the unshown supply circuit.

Also connected to the head drive control circuit 28 is a "track zero" sensor 34 comprising a source of radiation 36 and a photodetector 38. The "track zero" sensor 34 determines whether or not the transducer head 18 is on track zero of the magnetic disk 12 from the position of the rack 24 of the rotary to linear converter mechanism 22. The rack 24 intervenes between radiation source 36 and photodetector 38 when the transducer head 18 is on track zero.

Flexible Magnetic Disk Cartridge

Figure 2:
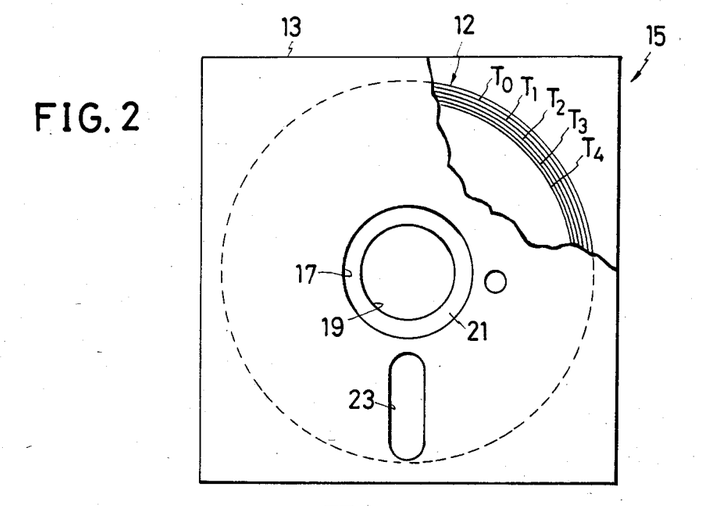
FIG. 2 is a plan view of a flexible magnetic disk cartridge for use with the storage file of FIG. 1, with the envelope of the cartridge being shown partly broken away to reveal the flexible magnetic disk enclosed therein.

As shown in detail in FIG. 2, the flexible magnetic disk 12 is usually enclosed in a more rigid, square envelope 13 to make up a disk assembly or cartridge 15 that is self supporting. The envelope 13 has in its opposite surfaces a central aperture 17 larger than a concentric central aperture 19 in the disk 12, thus exposing an annular portion 21 of the disk. This exposed portion of the disk 12 is to be engaged by the clamp mechanism 14 of the disk file 10. The envelope 13 also has an elliptical opening 23 that serves to expose a radial portion of the disk for accessing by the transducer head 18.

The magnetic disk 12 has a series of concentric magnetic tracks on its one or two sides. We refer to the outermost one of these concentric tracks as track zero, designated T0, and the other successive inward tracks as track one T1, track two T2, track three T3, track four, T4, etc.

Head Drive (Stepping) Motor

Reference is directed to FIG. 3 for the details of the head drive motor 20. The head drive motor is herein shown as a permanent magnet stepping motor comprising a stator 40 and a rotor 42, with the latter rotatably and concentrically mounted within the former. The stator 40 has a plurality of salient poles P1, P2, P3, P4, P5, etc., of annular arrangement about the axis of rotation of the rotor 42. The head drive stepping motor is of the four phase design. Thus each set of four neighboring stator poles P1 through P4 has first phase W1, second phase W2, third phase W3 and fourth phase W4 windings coiled respectively thereon. The disk drive motor 20 is shown to have four such sets of first, second, third and fourth phase windings W1 through W4 arranged sequentially and repetitively in the order named, so that the motor has a total of sixteen windings in the illustrated embodiment. The sequential excitation of these windings results in the rotation of the rotor 42 in discrete increments or steps.

Figure 4:
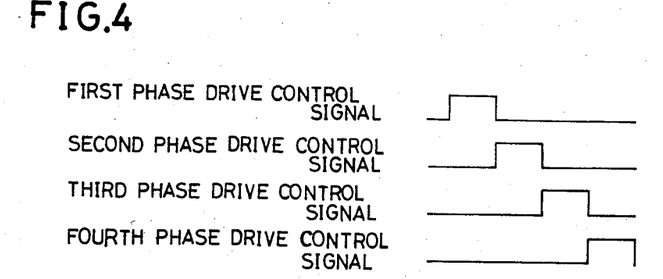
FIG. 4 is a waveform diagram plotting the drive pulse sequence for the normal single phase operation of the stepping motor of FIG. 3.

FIG. 4 diagrammatically plots the drive pulses applied to the first to fourth phase windings W1 through W4 for the normal incremental rotation of the rotor 41. It will be seen that the windings of each set are energized one at a time. This mode of operation is generally referred to as the single phase drive.

With reference again to FIG. 3 the steps of rotation of the disk drive motor 20 are in one to one correspondence with the magnetic tracks on the magnetic disk 12 in the illustrated embodiment. As indicated in this figure, the four stator poles P1 through P4 of the first set correspond respectively to track zero T0, track one T1, track two T2 and track three T3. The first stator pole P5 of the second set corresponds to track four T4, and so on.

Head Drive Control Circuit

Figure 5:
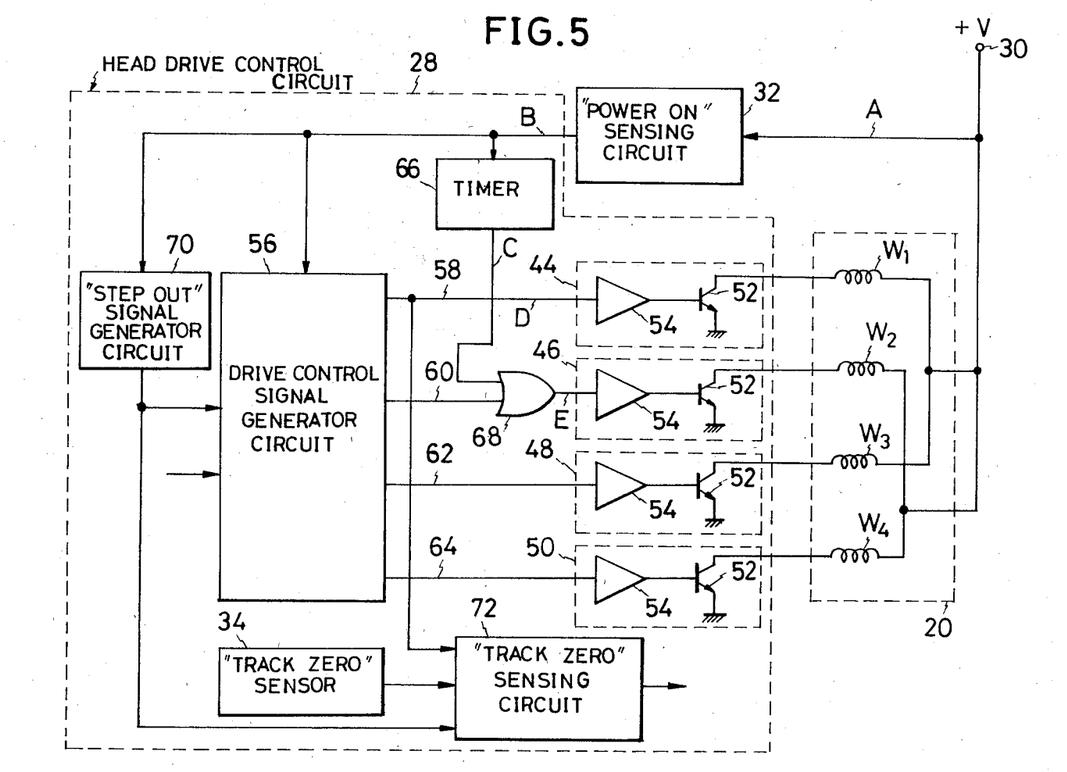
FIG. 5 is a block diagram of the head drive control system for controlling the stepping motor of FIG. 3 in accordance with our invention, there being also shown herein the stator windings of the stepping motor.

The head drive control circuit 28 is shown in detail in FIG. 5, together with the "power on" sensing circuit 32 and the four phase stator windings W1 through W4 of the head drive motor 20. The one set of stator windings W1 through W4 illustrated herein is representative of the four sets sets of windings in the exemplified stepping motor of FIG. 3. Each of the motor windings W1 through W4 has one extremity connected to the common positive supply terminal 30. The other extremities of the motor windings W1 through W4 are connected to first to fourth phase drive circuits 44, 46, 48 and 50 respectively. Each drive circuit comprises a switching transistor 52 and an amplifier 54. The switching transistor 52 of each drive circuit has its collector connected to one associated motor winding and its emitter grounded. The base of each switching transmitter 52 is connected to the output of the associated amplifier 54.

Connected to the inputs of the amplifiers 54 of the four drive circuits 44 through 50 is a drive control signal generator circuit 56 for the delivery thereto of first to fourth phase drive control signals in the form of pulses for switching the transistors 52. The drive control signal generator circuit 56 includes a pulse distributor, not shown, for distributing step pulses, which may be supplied from an external source, in the sequence of FIG. 4 or in the reversal thereof during the normal incremental rotation of the head drive motor 20. The drive control signal generator circuit 56 is connected to the inputs of the amplifiers 54 of the first to fourth phase drive circuits 44 through 50 by way of lines 58, 60, 62 and 64 respectively. The amplified replicas of the step pulses are impressed to the bases of the switching transistors 52 to cause sequential excitation of the stepping motor windings W1 through W4 from the positive supply terminal 30.

The aforesaid "power on" sensing circuit 32 has its output connected to the drive control signal generator circuit 56. When the disk file 10 is electrically turned on, the drive control signal generator circuit 56 responds to the corresponding output from the "power on" sensing circuit 32 to cause, via the first phase drive circuit 44, the energization of the first phase motor winding W1 for resetting the rotor 42.

Connected as above mentioned to the positive supply terminal 30, the "power on" sensing circuit 32 comprises a voltage comparator for comparing the supply voltage with a predetermined reference voltage. When the supply voltage builds up to the reference voltage upon closure of the unshown power switch, the output from the "power on" sensing circuit 32 goes high.

The "power on" sensing circuit 32 has its output connected not only to the drive control signal generator circuit 56 but also to a pulse generator circuit herein shown as a timer 66 which in practice may take the form of a monostable multivibrator. When the output from the "power on" sensing circuit 32 goes high upon closure of the power switch, the timer 66 puts out a pulse of a predetermined duration (e.g. 12 milliseconds). This pulse is used for the excitation of the second phase motor winding W2 in this particular embodiment.

Connected to the timer 66 to receive the above pulse therefrom is an OR gate 68, which has another input connected to the drive control signal generator circuit 56 via the second phase drive control signal output line 60. The output of the OR gate 68 is connected to the second phase drive circuit 46. Thus the OR gate 68 passes both the second phase drive control signal from the generator circuit 56 during normal rotation of the stepping motor 20 and the output pulse from the timer 66 upon closure of the power switch, for delivery to the second phase drive circuit 46.

The "power on" sensing circuit 32 has its output further connected to a "step out" signal generator circuit 70. This circuit 70 responds to the output from the "power on" sensing circuit 32 to generate a "step out" signal for causing the head drive motor 20 to rotate in such a direction that the transducer head 18, FIG. 1, is moved radially outwardly of the magnetic disk 12 (i.e. toward track zero) when the disk file 10 is electrically turned on. The "step out" signal generator circuit 70 has its output connected to both the drive control signal generator circuit 56 and a "track zero" sensing circuit 72.

The "track zero" sensing circuit 72 can be a three input AND gate having one input connected to the "step out" signal generator circuit 70. The other two inputs of the "track zero" sensing circuit 72 are connected to the "track zero" sensor 34 and to the first phase drive control signal output line 58 of the drive control signal generator circuit 56. Consequently the output from the "track zero" sensing circuit 72 goes high only when the first phase drive control signal from its generator circuit 56, the output from the "track zero" sensor 34, and the "step out" signal from its generator circuit 70 are all high.

As has been stated in conjunction with FIG. 1, the "track zero" sensor 34 is a combination of the radiation source 36 and photodetector 38. The rack 24 of the rotary to linear converter mechanism 22, or a suitable radiation interrupter mounted thereto, intervenes between radiation source 36 and photodetector 38 when the transducer head 18 is on track zero of the magnetic disk 12, causing the output from the photodetector to go high. However, optically sensing the position of the transducer head 18 from that of a mechanical part, the "track zero" sensor 34 almost unavoidably gives rise to sensing errors which may amount to as much as three tracks on the magnetic disk 12. In the worst case of such sensing errors, therefore, the "track zero" sensor output may go high when the transducer head 18 is actually on track two.

Operation

We will now describe the operation of the disk file 10, particularly with regard to its the head drive control circuit 28 constituting a feature of our invention. The disk drive motor 20 is excited in the single phase drive mode during the normal operation of the disk file 10 for data transfer. The drive control signal generator circuit 56 puts out the step pulses as in the sequence of FIG. 4 for application to the drive circuits 44 through 50. Upon sequential conduction of the switching transistors 52 in these drive circuits 44 the stepping motor windings W1 through W4 are sequentially excited to cause rotation of the rotor 42. The rotary to linear converter mechanism 22 translates the rotation of the rotor 42 into the linear motion of the transducer head 18 in the radial direction of the magnetic disk 12.

The following, then, is the discussion of the performance of the disk file 10, or of its head drive control circuit 28, when the device is electrically turned on. We will refer to the waveform diagram of FIG. 6 for such discussion. This figure represents at A through E the waveforms appearing in the various parts of the head drive control system of FIG. 5. Thus in FIG. 5 we have indicated by the capitals A through E the parts on which the corresponding waveforms of FIG. 6 appear.

Figure 6:
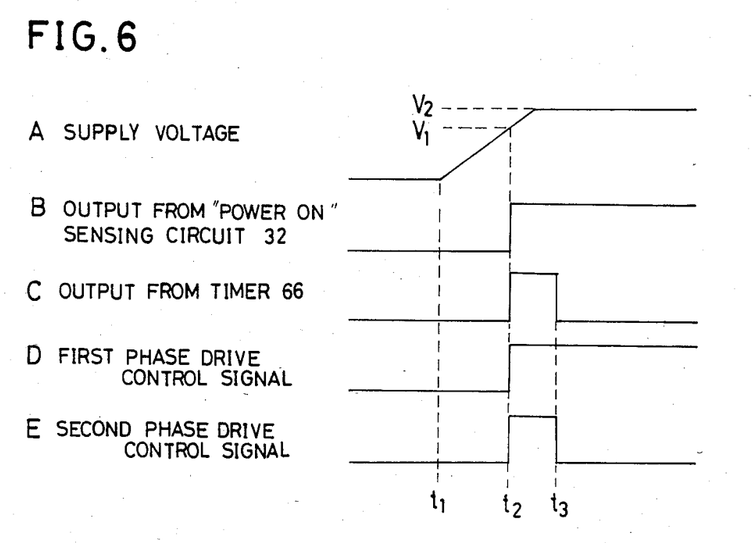
FIG. 6, consisting of A-E, is a waveform diagram plotting waveforms appearing in various parts of the drive control system of FIG. 5 when the disk file is electrically turned on, the waveforms being useful in explaining the operation of the control system.

It will be seen from A in FIG. 6 that the unshown power switch is turned on at a moment t1 in time. When the direct current voltage appearing at the positive supply terminal 30 subsequently rises to a predetermined value V1 at a subsequent moment t2, the output from the "power on" sensing circuit 32 goes high as at B in FIG. 6. The predetermined supply voltage value V1 at which the "power on" sensing circuit output goes high may be approximately 80 percent, for example, of the rated supply voltage V2.

The timer 66 responds to the high output from the "power on" sensing circuit 32 to produce a high output for the prescribed length of time (12 milliseconds) from moment t2 to moment t3. The drive control signal generator circuit 56 also responds to the high output from the "power on" sensing circuit 32; as indicated at D in FIG. 6, the first phase drive control signal goes high at the moment t2. The drive control signal generator circuit 56 applies the first phase drive control signal to the first phase drive circuit 44, with the consequent energization of the first phase windings W1 of the head drive motor 20. Also the high output from the timer 66 passes the OR gate 68 and enters the second phase drive circuit 46 as the second phase drive control signal plotted at E in FIG. 6. The second phase windings W2 of the head drive motor 20 are therefore excited only during the period from moment t2 to moment t3.

The above brief energization of the second phase windings W2 will serve no purpose at all if the rotor 42 of the head drive motor 20 has been aligned with other than the third phase winding W3 of the first winding set, which corresponds to track two T2 of the magnetic disk 12, when the device is switched on. However, if the rotor has been in alignment with that third phase winding W3, the excitation of the second phase winding W2 of the first winding set does serve to move the rotor away therefrom. Since the first phase winding W1 of the first winding set, which corresponds to track zero T0, is held energized after the moment t3 as at D in FIG. 6, the rotor will subsequently move into alignment therewith. The result is the return of the transducer head 18 to the track zero position on the magnetic disk 12.

The signal produced then by the "track zero" sensor 34 truly reflects the track zero position of the transducer head 18 on the magnetic disk 12. It has thus become possible to start proper data transfer between disk 12 and head 18 even if the stepping motor rotor 42 has initially been aligned with the third phase winding W3 corresponding to track two.

Alternative Stepping Motor

Figure 7:
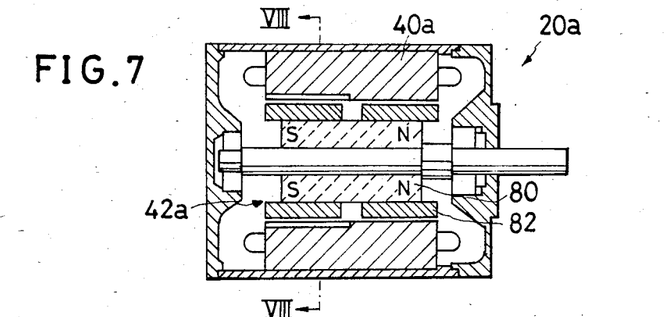
FIG. 7 is an axial section through a hybrid stepping motor constituting another example of stepping motor to be built into the disk file in accordance with our invention.
Figure 8:
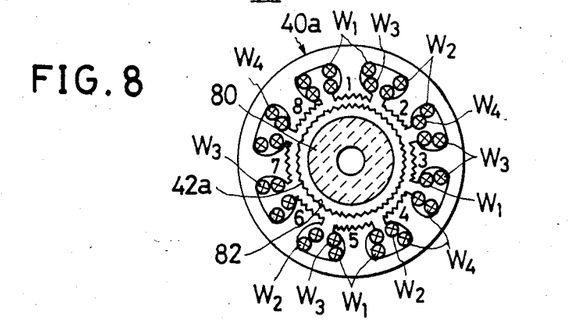
FIG. 8 is a cross section through the hybrid stepping motor of FIG. 7, taken along the line VIII—VIII therein.

Our invention allows the use of not only the permanent magnet stepping motor 20 of FIG. 3 but also a hybrid stepping motor 20a of FIGS. 7 and 8, as the head drive motor. The hybrid stepping motor 20a has a rotor 42a comprised of a permanent magnet 80 and laminar steel cladding 82. The rotor 42a is toothed on its surface, and so are the poles of a stator 40a, to afford rotation of the rotor by small increments. The motor 20a is shown to have eight poles designated 1 through 8, and each pole has two windings in radially offset positions thereon. The outer windings are arranged in the order of the first phase W1, second phase W2, third phase W3, fourth phase W4, first phase W1, second phase W2, third phase W3 and fourth phase W4, and the inner windings are arranged in the order of the third phase W3, fourth phase W4, first phase W1, second phase W2, third phase W3, fourth phase W4, first phase W1 and second phase W2, on the poles 1 through 8, respectively.

Alternative Head Drive Control Circuit

Figure 9:
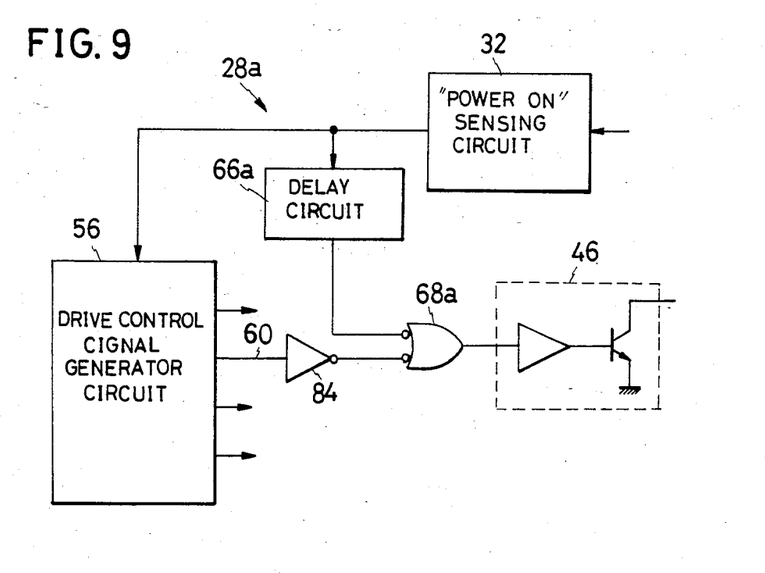
FIG. 9 is a partial block diagram of a modification of the head drive control system of FIG. 5.

FIG. 9 shows only essential parts of a modified head drive control circuit 28a, wherein a delay circuit 66a is substituted for the timer 66 in the head drive control circuit 28 of FIG. 5. The delay circuit 66a has its input connected to the "power on" sensing circuit 32 and its output to a first input of a NAND gate 68a which replaces the OR gate 68 in the head drive control circuit 28 of FIG. 5. A second input of the NAND gate 68a is connected to a NOT circuit 84 which in turn is connected to the drive control signal generator circuit 56 via the second phase drive control signal line 60. The output of the NAND gate 68a is of course connected to the second phase drive circuit 46. The other details of the modified head drive control circuit 28a are not shown since they can be identical with those of the FIG. 5 circuit 28.

The delay circuit 66a functions to impart a time delay of, say, 12 milliseconds to the output from the "power on" sensing circuit 32 shown at B in FIG. 6. Thus the NAND gate 68a puts out a second phase drive pulse akin to that depicted at E in FIG. 6, for application to the second phase drive circuit 46. It is therefore apparent that the modified head drive control circuit 28a also makes possible the positive return of the transducer head 18 to track zero upon closure of the power switch.

Possible Modifications

Although we have shown and described our invention in terms of but one embodiment and slight modifications thereof, it is understood that our invention is not limited thereto but comprehends a variety of additional modifications or alterations within the broad teaching hereof. We will enumerate in the following some examples of such possible modifications that will readily occur to those versed in the electronics art:

1. The first and second phase drive control signals may not necessarily be made to go high at the same moment following the closure of the power switch; thus, the head drive control circuit may be modified to make the first phase drive control signal go high at the moment t3 in FIG. 6, for example, when the second phase drive control signal goes low.

2. The head drive control circuit may be modified to energize the fourth phase windings, instead of the second, for a predetermined length of time when the disk file is switched on. The brief energization of the fourth phase windings will cause the rotor to shift from the third phase winding of the first winding set, if it has been detented thereto, to the adjoining fourth phase winding. If the "track zero" sensor in use has sensing errors amounting to three tracks on the magnetic disk, the output from the "track zero" sensing circuit 72 of FIG. 5 will not represent the track zero position of the magnetic disk when the stepping motor rotor is aligned with the fourth winding of the first winding set which corresponds to track three. In this case the stepping motor will be further controlled to return the transducer head to track zero in the known manner.

3. It is also possible to briefly energize selected pairs of the second, third and fourth phase windings, with the concurrent or subsequent energization of the first phase windings, as the case may be, for returning the transducer head to track zero upon closure of the power switch.

4. The first and second phase drive control signals given at D and E in FIG. 6 may be made to go high earlier or later than the moment t2.

5. The rotation of the stepping motor may be translated into the linear motion of the transducer head not by the rack and pinion mechanism, as in the illustrated embodiment, but by a flexible steel band of alpha configuration, a lead screw, etc.

6. If the disk file has two different positive supply terminals, such as those for five and twelve volts, then the "power on" sensing circuit may be modified to sense the two voltages, producing a signal when they rise to prescribed levels.

7. A pulse counter may be employed in place of the timer 66 in the head drive control circuit 28, with the counter producing a pulse output corresponding to a total number of clock pulses that it has received during a preassigned time interval.

8. The stator windings of the stepping motor may not necessarily be in one to one correspondence with the tracks on the magnetic disk; for example, one track may correspond to a plurality of motor steps.

9. The storage file construction may be modified for use with record media other than flexible magnetic disks, such as nonflexible magnetic disks and optical disks.

What we claim is:

1. A storage file for use with a disklike record medium, comprising:
   (a) a rotary drive mechanism for imparting rotation to the record medium;
   (b) a transducer head for data transfer with the record medium;
   (c) a radial drive mechanism comprising a four phase stepping motor for moving the transducer head radially with respect to the record medium, the stepping motor having a rotor and a plurality of sets of first, second, third and fourth phase windings arranged sequentially in the order named; and
   (d) control circuit means for normally energizing the windings of the stepping motor in a single phase drive mode to cause rotation of the rotor thereof in discrete increments, the control circuit means being adapted to energize at least one of the second, third and fourth phase windings in each set for a preassigned length of time when the storage file is electrically turned on and to start energizing the first phase windings by the end of the preassigned length of time
   so as to turn the rotor of the stepping motor from a possible alignment with the third phase winding in any set when the storage file is turned on and into alignment with a first phase winding.

2. The disk storage file of claim 1 wherein the control circuit means is adapted to energize the first phase windings of the stepping motor concurrently with the energization of at least one of the second, third and fourth phase windings in each set, and to continue energizing the first phase windings upon lapse of the preassigned length of time.

3. The disk storage file of claim 1 wherein the control circuit means comprises a "power on" sensing circuit for producing an output in response to the fact that the storage file is electrically turned on, and a head drive control circuit comprising:
   (a) first, second, third, and fourth phase drive circuits connected to the first, second, third and fourth phase windings, respectively, of the stepping motor to cause selective energization thereof;
   (b) a drive control signal generator circuit connected to the first, second, third and fourth phase drive circuits for normally causing therethrough the selective energization of the windings of the stepping motor in the single phase drive mode, the drive control signal generator circuit being further responsive to the output from the "power on" sensing circuit to cause the energization of the first phase windings of the stepping motor via the first phase drive circuit when the storage file is electrically turned on; and
   (c) pulse generator circuit means responsive to the output from the "power on" sensing circuit for applying a pulse to at least one of the second, third and foruth phase drive circuits to cause the energization of the corresponding windings of the stepping motor for the preassigned length of time when the storage file is electrically turned on.

4. The disk storage file of claim 3 wherein the pulse generator circuit means of the head drive control circuit comprises a timer for generating the pulse having a duration representation of the preassigned length of time in response to the output from the "power on" sensing circuit.

5. The disk storage file of claim 3 wherein the pulse generator circuit means of the head drive control circuit comprises:
   (a) a delay circuit for imparting a prescribed delay to the output from the "power on" sensing circuit;
   (b) a NOT circuit; and
   (c) a NAND gate having a first input connected to the delay circuit, a second input connected to the drive control signal genertor circuit via the NOT circuit, and an output connected to at least one of the second, third and fourth phase drive circuits.

6. A record storage system comprising:
   a record storage medium;

a transducer head for data transfer with respect to the storage medium;

a drive mechanism comprising a four phase stepping motor adapted for moving the transducer head linearly with respect to the record storage medium, the stepping motor having a rotor and a plurality of sets of first, second, third and fourth phase windings arranged sequentially in the order named; and control circuit means for normally energizing the windings of said stepping motor in a single phase drive mode to cause rotation of the rotor thereof in discrete increments, and further adapted for energizing one of the second and fourth phase windings in each set for a pre-assigned length of time when the control circuit means is first electrically energized and to energize the first phase windings for a period of time commencing by the conclusion of said pre-assigned length of time so as to move said rotor into alignment with a first phase winding regardless of the position of the rotor with respect to the phase windings when the system is first electrically energized.

7. A record storage system comprising:

a record storage medium;

a transducer head for data transfer with respect respect to the storage medium;

a drive mechanism comprising a four phase stepping motor adapted for moving the transducer head linearly with respect to the record storage medium, the stepping motor having a rotor and a plurality of sets of four phase windings arranged sequentially; and control circuit means for normally energizing the windings of said stepping motor in a single phase drive mode to cause rotation of the rotor thereof in discrete increments, and further adapted for energizing at least an identical pair of adjoining phase windings in each set when the control circuit means is first electrically energized, one of said pair of phase windings in each set being energized for a pre-assigned length of time and the remaining one of said pair of windings in each set being energized for a longer period of time commencing by the end of said pre-assigned length of time so as to move said rotor into alignment with said remaining one of the pahse windings regardless of the position of the rotor with respect to the four phase windings when the system is first electrically energized.

* * * * *

UNITED STATES PATENT AND TRADEMARK OFFICE
CERTIFICATE OF CORRECTION

PATENT NO. : 4,594,620

DATED : June 10, 1986

INVENTOR(S) : Makoto Shoji and Yoshiaki Sakai

It is certified that error appears in the above-identified patent and that said Letters Patent is hereby corrected as shown below:

Claim 5, column 10, line 9, delete "genertor"
and substitute --generator-- therefor.

Claim 7, column 12, line 22, delete "pahse"
and substitute --phase-- therefor.

Signed and Sealed this

Twenty-sixth Day of August 1986

[SEAL]

Attest:

DONALD J. QUIGG

Attesting Officer

Commissioner of Patents and Trademarks